United States Patent [19]

Tauszig

[11] 4,024,340

[45] May 17, 1977

[54] CIRCUIT FOR AN ELECTRONIC STENCIL CUTTING MACHINE

[76] Inventor: Julio G. Tauszig, Int. Tompkinson 3069, Buenos Aires, Argentina

[22] Filed: Sept. 12, 1975

[21] Appl. No.: 612,636

[30] Foreign Application Priority Data

Feb. 27, 1975 Argentina .......................... 257800

[52] U.S. Cl. ................................ 358/297; 346/163

[51] Int. Cl.[2] ......................................... H04N 1/00

[58] Field of Search ..................... 178/6.6 B, 6.6 R; 346/74 SB

[56] References Cited

UNITED STATES PATENTS

| | | | |
|---|---|---|---|
| 3,801,738 | 4/1974 | Egerton | 178/6.6B |
| 3,952,144 | 4/1976 | Kolker | 178/6.6 R |

*Primary Examiner*—Thomas B. Habecker
*Attorney, Agent, or Firm*—Peter S. Lucyshyn

[57] ABSTRACT

Apparatus for electrically burning information from an original document into stencil material comprising a stylus for applying electrical pulses to the material and an electrical circuit comprising an optical sensor for scanning information on the original and providing an output signal, the amplitude of which is proportional to the light reflected by the information, a circuit for providing a pulse train the shape of which conforms to the non-linear characteristics of the stencil material and a comparator for combining the output signal and pulse train to provide the electrical pulses having a width determined by the combination for application to the stylus, includes circuitry interposed between the optical sensor and the comparator for setting the minimum and maximum amplitudes of the output signals from the optical sensor representing tones to be reproduced as black and white, respectively. A first circuit portion for setting the minimum black level includes an operational amplifier having first and second inputs and an output, the output of the optical sensor being coupled to the first input and a variable voltage applying circuit being coupled to the second input. The provision at the output of the amplifier of a predetermined voltage indicates the minimum level of voltage from the optical sensor for the reproduction of black tones. A second operational amplifier having first and second inputs and an output is coupled at the first input to the output of the first operational amplifier with the second input of the operational amplifier being coupled to the output thereof and to a second variable voltage applying circuit. Upon production of a predetermined output voltage at the output of the second operational amplifier, the maximum level of voltage for reproduction of white tones is set. The operational amplifiers are sequentially set by positioning the optical sensor adjacent information representing black and white, respectively, and thereafter adjusting the respective variable voltage applying circuit.

6 Claims, 4 Drawing Figures

CIRCUIT FOR AN ELECTRONIC STENCIL CUTTING MACHINE

BACKGROUND OF THE INVENTION

The present invention refers to circuitry for an electronic stencil engraving machine.

SUMMARY OF THE INVENTION

The main object of the present invention is to unite the elements necessary to achieve copies of excellent quality as well as to offer a great adaptability for a wide range of work types. Among others, it fulfills the following important requirements:

Control of the light tones which does not interact with the reproduction of the dark tones; control of the voltage of stylus, which does not interact with the above; easily changing from positive to negative copies; adaptability to reproduce half tones or line copy; establishing the best signal/noise relationship in all calibrations; to be able to employ optical filters of high density (separation of colors); and the availability of photometry and of run compensation for aging, simultaneously, with light emitting diode indicators.

There are presently known electronic stencil engraving or cutting machines, the operation of which is based on impulse signals obtained from photomultipliers scanning an original document to be reproduced, which are directly proportional to the intensity of the drawing or of the graphic structure of the original. The output of the photomultiplier is applied to a generator which produces discharges at a stylus, the sparks of which reproduce the image of the original by burning into stencil material. The known devices suffer many drawbacks resulting, principally, from the interaction between the controls from the low signal/noise ratio and from the period of engraving start, etc.

All of the above-mentioned problems are solved by means of the present invention, which basically consists of a circuit construction device based on the fact that the reference tone to be reproduced as black generates a current which when normalized is neutral and develops a zero potential difference at the blank (spacing) control terminals which comprise a rheostat and associated elements, which potential difference can be detected on a diode in series with it. The detector comprises a differential operational amplifier which changes the state of conduction of its output, activating an indicator. The level of relative signals of reproduction and their absolute value are pre-calibrated in each of the rheostats placed in the amplifier. The above-mentioned indicator is in a preferred embodiment, a photoemitting diode. The circuit provides a reference voltage to determine the correct voltage. The comparison is accomplished by means of a differential operational amplifier which changes the state of conduction of its output, activating the indicator which consists of a photoemitting diode.

DESCRIPTION OF THE DRAWINGS

In order to better understand the present invention as well as the execution of same in its fundamental idea, there shall be given below a precise description of one preferred form of execution, with reference in same to the attached drawing given as an illustrative and not limitative example of the present invention, in which.

DETAILED DESCRIPTION OF THE DRAWINGS

Figure 1:
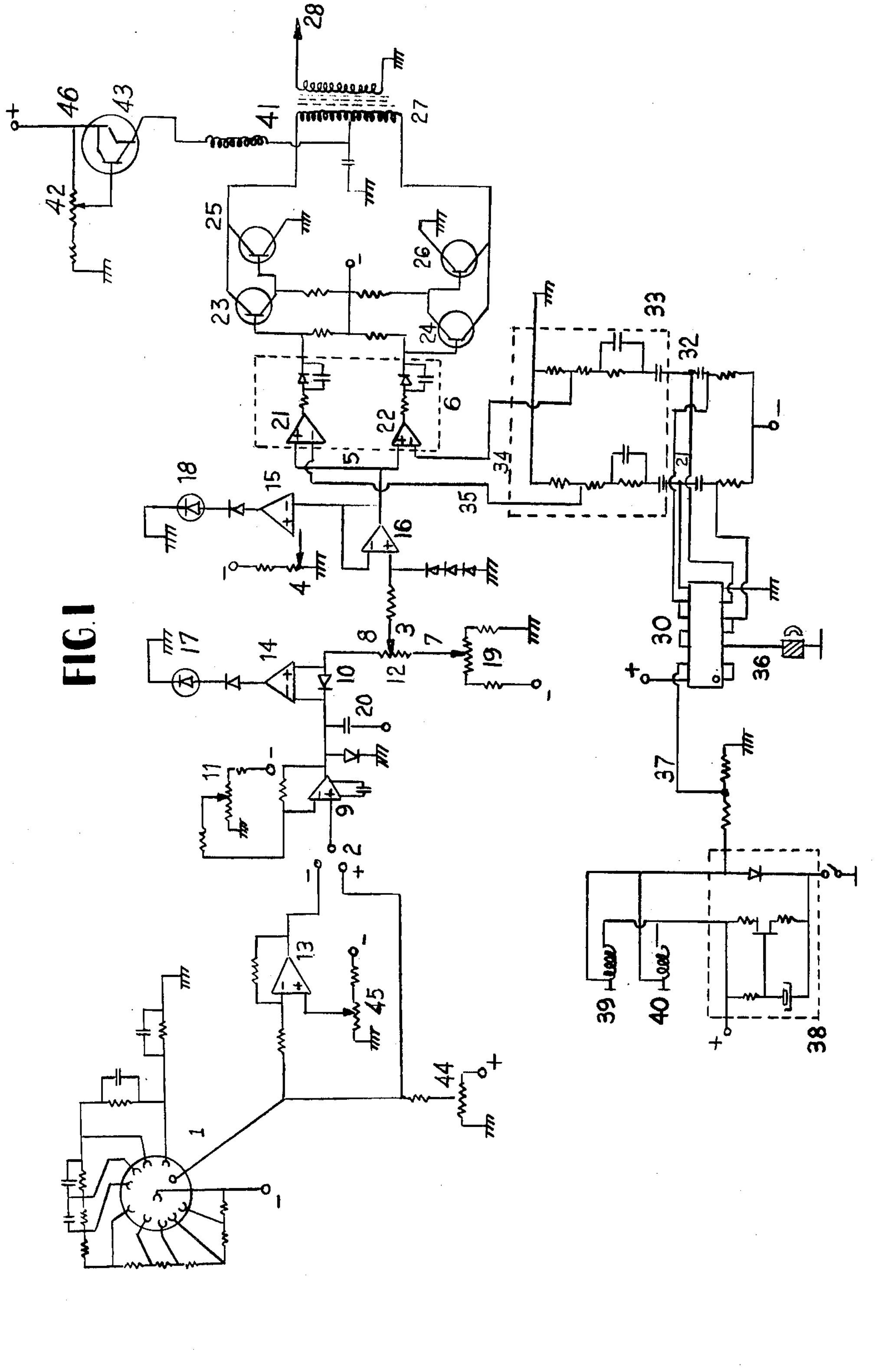
FIG. 1 consists of the electronic diagram of the circuit of the invention.

In the figures, the same reference characters indicate the same or corresponding parts.

In essence, and in the particular case being illustrated, the circuit for electronic stencil engraving or cutting is composed of four low cost operational amplifiers, designated by the reference numbers 13, 14, 15 and 16, respectively, joined in an integrated circuit, and an amplifier, also operational, designated by 9, with a higher maximum work frequency.

The signal of optical sensor or phototube 1 changes polarity with the operational amplifier 13 which operates as an inverter with a gain of one.

By key or relay 2, there is chosen the direct or inverted signal to be amplified in operational amplifier 9. The amplified signal is applied through the diode 10, to potentiometer 12. The control of blacks, 11, causes the voltage at the output of amplifier 9 to vary depending on the reference tone which is selected to be reproduced as black in the copy, so that adjusting does not vary later upon regulating the white tone control 12. Selection of the tone on the original to be reproduced as black is made by positioning the optical sensor or phototube 1, adjacent information desired to be reproduced as black. For the latter the condition must be met that for the tone to be represented as black, the voltage across the potentiometer 12 must be zero, so that the voltage at point 3 will also be zero regardless of the reference of the final position of that control.

The operational amplifier 14 detects the exact time at which the voltage on diode 10 is zero, this being indicated by the photoemitting diode (LED) 17. Voltage on 10 being zero, there is also a null of the current which circulates through potentiometer 12, the voltage at its terminals being zero. In case there are tones darker than the one chosen to normalize 10, they remain inversely polarized, causing no changes in the voltage at potentiometer 12.

To normalize the voltage for the light tones which are to be reproduced as whites, the output 5 must have a sufficient negative voltage to succeed in turning off modulator 6, the voltage being determined by comparing it with point 4 which serves as a reference. When the voltages at 4 and 5 are equal, they are detected by the change in conduction of operational amplifier 15 which is indicated in the respective photoemitting diode (LED) 18.

The voltage at terminal 5 is substantially the same as that at terminal 3, and is adjusted by varying potentiometer 12 while the optical sensor or phototube 1 is positioned to information on the original of a tone which is desired to be reproduced as white. Potentiometer 12 operates as the control for the white tones.

Modulator 6 requires at its input 5 to go from full conduction to cut-off, a voltage variation of the order of one volt, being approximately −1 volt to cancel the R.F., to −0.08 to give full output power, for which reason terminal 7, instead of being connected to the voltage source is connected through voltage divider 19 which determines the most positive limit value which terminal 5 can reach.

Capacitor 20 is used to regulate the focusing of the lens. Placing a screen in the cylinder on which the original and stencil are mounted adjacent the phototube, will generate an alternating current the amplitude of which will be maximum when the optical sensor is correctly focused. This makes it possible to measure the alternating current without the direct component by means of any multiammeter over a scale of approximately 2.5 volt of alternating current.

The level of lighting which the original receives is constant and the maximum obtainable with the optical and lighting system (not shown) employed. Reduction of the video signal is achieved by dividing the signal by means of potentiometer 12, and together with the signal the noise which fundamentally comes from phototube 1 is also reduced. Other systems require the reduction of the lighting level to reduce the signal, but as the noise remains constant, this worsens the signal/noise ratio and the stability.

Figures 2, 3, 4:
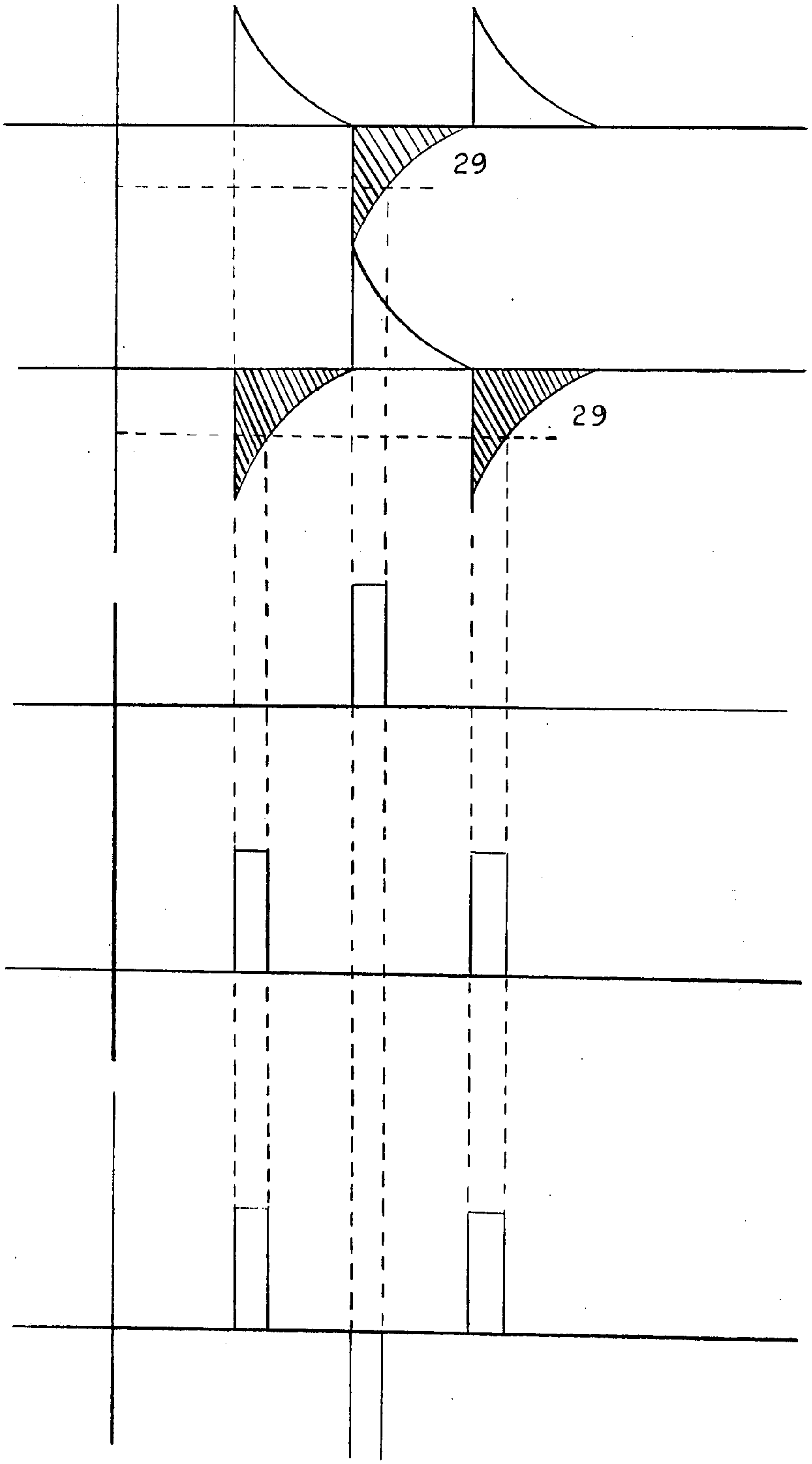
FIG. 2 is a diagrammatical representation of the exponential impulses applied to two rapid differential comparators.
FIG. 3 represents diagrammatically the rectangular impulses of each comparator, with a 180° phase difference between them.
FIG. 4 represents diagrammatically, the alternating rectangular impulses which are applied to the engraving wire or stylus of the stencil cutting machine.

There will now be described the operation of modulator and the power amplifier. Modulator 6 transforms the video signal delivered by the amplifier into square alternating impulses the width of which varies according to the magnitude of the modulating signal. The width and amplitude relationship of the impulses is maintained in an exponential relationship in which there corresponds, for a Delta V ($\Delta V$) in the most negative extreme a small Delta Theta ($\Delta\theta$) while the same Delta V ($\Delta V$) at the most positive end (corresponding to the dark tones) produces a much greater Delta Theta ($\Delta\theta$). That relationship is set to create the major transference of half tones on the materials to be engraved. It has two rapid differential comparators 21, and 22, at its positive inputs to which there is applied the video signal and to its negative inputs there are applied the exponential impulses with a 180° phase difference between them (See FIG. 2). The negative semi-cycles (lined in the Figures), are used only so that when the positive terminal is more positive than the negative, the output of the comparator assumes a level of approximately 3 volts. In the opposite case it goes down to approximately −0.5 volt. The periods of change of state of the output of the comparators being very much shorter than the duration of the semi-cycle in FIG. 2, rectangular impulses are obtainable from each comparator with a phase difference of 180° between them (FIG. 3). Those impulses are amplified by means of transistors 23, 24, 25 and 26, and they are applied to transformer 27, so that at its output 28 there will be obtained alternating impulses (FIG. 4) which are applied to the engraving wire or stylus. The width of those impulses, and therefore the energy they contain varies between 180° and 0°.

The proportionality between the modulation voltage 5 and the output energy is given by curve 29 (See FIG. 2). The semi-cycles with suitable curve are obtained from a multivibrator 30 on the terminals of which, terminals 31 and 32, there are obtained square wave impulses with a phase difference of 180° between them which, immediately after passing through equalizer 33, emerge with the correct shape in 34 and 35, which are the negative input terminals of the comparators. Changing the capacity and resistance values of equalizer 33, it is possible to modify the curve to obtain the best possible results when engraving a range of half tones. The oscillation of the multivibrator can be cancelled by connecting terminal 36 to ground. The latter is done to remove the engraving energy from the stylus as it passes over the clamp holding the stencil on the rotating copy cylinder. A magnet mounted in the cylinder closes a stationary reed switch to connect said terminal in a synchronous manner with ground.

When a positive voltage is applied at terminal 37 the oscillation of the multivibrator is also cancelled. Terminal 37 is connected to an electronic timer 38 which activates the oscillation after a few seconds following the beginning of the engraving cycle, giving time for the rotatable speed of the cylinder to have become established, as well as the voltage, etc. It also simultaneously activates the electromagnets 39 and 40 which move the wire or stylus to the cylinder and start the translational motion of the wire and of the optical system with respect thereto.

The maximum voltage of output 38 is limited by reducing the feeding voltage 40 to transistors 23, 24, 25 and 26. That voltage, reduced but perfectly controlled even for different load regimes, as obtained from the voltage divider 42 which regulates the drop of voltage in a double transistor 43 in "Darlington" connection, which operates as voltage follower.

From what has been explained, there can be seen as essential novelties of the present invention the following characteristics, obtained by means of the elements mentioned, and the associated components, that is to say:

The reference tone to be reproduced as black creates a current which, when normalized or standardized is neutralized and which develops a zero difference of potential across the potentiometer 12 which controls the whites. The difference of potential zero on potentiometer 12 is detected on a diode 10 connected in series therewith. The detector includes a differential operational amplifier 14 which changes the polarity or the state of conduction of its output, activating the indicator 17. Precalibrating of levels of relative signals of reproduction positive-positive and positive-negative (44 and absolute values of same, 45) obtained prior to the white control 12, and black control 11. The indicators are "LEDS" or light emitting diodes 17 and 18. The tone to be reproduced as white taken as a reference, creates a voltage in 8 which is reduced to the correct value across 12. The correct voltage is determined by comparison with a reference voltage at 4. The comparison is performed with a differential operational amplifier 15 which changes the polarization or the state of conduction of its output activating the indicator, which consists of the "LED", light emitting diode 18. The modulator comprises one or two rapid differential comparators with an input connected to the video signal and the other to the impulses with the carrying frequency and exponential curve, so as to obtain at its output rectangular waves of constant height and of variable width in relation with the modulating signal. The exponential shaped wave 34, 35 applied to the comparators, is selected accoring to the non-linear characteristics of the stencil material and obtained from a multivibrator 30 which delivers square impulses, and those are shaped by passing across a filter channel 33. The output voltage of the burning signal 28 is adjusted by reducing the voltage of the dc source 46 applied to the output by a transistor 43 of high gain, preferably a pair of same in "Darlington" connection, working in connection of voltage follower.

Consequently, the circuit has a construction arrangement based on the fact that the reference tone to be reproduced as black generates a current which when normalized or standardized, is neutralized, and develops a zero potential at the white control which comprises a potentiometer with a diode in series with a detector defined by a differential operational amplifier which changes its state of conduction of its output activating and indicator constituted by a "LED" photoemitting diode. The relative levels of the reproduction signals, and their absolute value are pre-calibrated in two potentiometers placed at the output of the phototube, which are related with at least one operational amplifier. The circuit also provides a reference signal to determine the correct voltage level for tones to be reproduced as white, with a potentiometer and a differential operational amplifier in series, with which there is connected a diode and an indicator constituted by a "LED" photoemitting diode. The circuit moreover includes a modulator with at least one rapid differential comparator, one input of which is connected to the video signal and the other to impulses with exponential curve and frequency carrying generated by a multivibrator and shaped by a high-pass filter. The signal is applied to the output step to provide the voltage of the signal used to burn the stencil. The latter voltage level is adjusted by means of a double transistor in "Darlington" connection employed as a voltage follower.

It is logical to assume that when the present invention is applied, it will be possible to introduce into it modifications without departing from its fundamental principles specified in the following claims.

What I claim is:

1. In an apparatus for electrically burning information from an original document into a stencil material having non-linear burning characteristics including a stylus for applying electrical pulses for burning said material and an electrical circuit coupled to said stylus for providing said electrical pulses thereto, said circuit comprising optical sensor means for scanning the information on said original document and providing an output signal the amplitude of which is proportional to the light reflected by said information, circuit means for providing a train of pulses the shape of which conforms to the non-linear characteristics of the stencil material and means coupled to said optical sensor means, said circuit means and said stylus means for comparing the signal provided by said sensor means and the pulses provided by said circuit means to produce output pulses having widths determined by said comparator circuit means for application to said stylus for use in burning said stencil material, the improvement including circuit means interposed between said optical sensor means and said pulse comparing means for setting the minimum amplitude of the output signal from said optical sensor means for tones to be reproduced as black and for setting a maximum amplitude of the output signals from said optical sensor means for tones to be reproduced as white, said last-mentioned circuit means including a first circuit portion for setting the minimum amplitude of said output signal for tones to be produced as black comprising first circuit element means having first and second input and an output, said optical sensor means connected to said first input for providing a reference signal of a level indicative of the tone to be reproduced as black, variable voltage applying means coupled to said second input for applying a voltage thereto selected to produce an output of a predetermined voltage level and first means for indicating the production of said predetermined voltage level at said output, whereby any signal produced by said optical sensor means of a level lower than or equal to the level of said black reference signal produces a comparator output pulse having a maximum width for application to said stylus and a second circuit portion for setting the maximum amplitude of the output signal of said optical sensor means for tones to be reproduced as white, comprising second circuit element means having an input and output, said optical sensor means effectively connected to said input for providing a reference signal of a level indicative of the tone to be reproduced as white, variable voltage applying means coupled to said input for applying a voltage thereto selected for producing an output of a predetermined voltage level and second means for indicating the production of said predetermined voltage level at said output whereby any signal produced by said optical sensor means of a level greater than or equal to said white reference signal produces a comparator output pulse of zero for application to said stylus.

2. Apparatus as claimed in claim 1 wherein said first circuit element means comprises an operational amplifier, wherein said variable voltage applying means includes a voltage divider network including potentiometer means for selecting a predetermined voltage for application to said second input of said operational amplifier and wherein said first indicating means includes a light-emitting diode coupled to the output of said operational amplifier, said light-emitting diode being energized upon the production of said predetermined voltage level at said output.

3. Apparatus as claimed in claim 1 wherein said second circuit element means includes a second operational amplifier having first and second inputs and an output, said first input being coupled to said optical sensor means through said first circuit portion, said output being connected to said second input and said second indicating means for providing an inverted output signal to said second indicating means.

4. Apparatus as claimed in claim 3 wherein said predetermined voltage level at the output of said first circuit element means is zero, whereby the voltage potential provided by said first circuit portion at said first input of said second operational amplifier is zero.

5. Apparatus as claimed in claim 4 further including voltage modulator means coupled to the output of said second operational amplifier and wherein the predetermined voltage at the output of said last-mentioned operational amplifier is a voltage of a level sufficiently negative to turn off said modulator thereby to set the maximum amplitude of output signals of said circuit to be reproduced as white.

6. Apparatus as claimed in claim 3 wherein said second indicating means includes a light-emitting diode being energized by the production of said predetermined voltage level at the output of said second operational amplifier.

* * * * *

UNITED STATES PATENT OFFICE
CERTIFICATE OF CORRECTION

Patent No. 4,024,340 Dated May 17, 1977

Inventor(s) Julio G. Tauszig

It is certified that error appears in the above-identified patent and that said Letters Patent are hereby corrected as shown below:

Col. 4, line 62 should read:

"comparators, is selected according to the non-linear"

Signed and Sealed this

*ninth* Day of *August 1977*

[SEAL]

*Attest:*

RUTH C. MASON
*Attesting Officer*

C. MARSHALL DANN
*Commissioner of Patents and Trademarks*